US011656947B2

(12) United States Patent
Wilcock et al.

(10) Patent No.: US 11,656,947 B2
(45) Date of Patent: May 23, 2023

(54) DATA SET RECOVERY FROM A POINT-IN-TIME LOGICAL CORRUPTION PROTECTION COPY

(71) Applicant: International Business Machines Corporation, Armonk, NY (US)

(72) Inventors: Glenn Randle Wilcock, Tucson, AZ (US); Robert Stanley Gensler, Jr., Bevercreak, OH (US); Shannon Lyn Gallaher, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 194 days.

(21) Appl. No.: 16/907,082

(22) Filed: Jun. 19, 2020

(65) Prior Publication Data

US 2021/0397519 A1 Dec. 23, 2021

(51) Int. Cl.
*G06F 11/14* (2006.01)

(52) U.S. Cl.
CPC ...... *G06F 11/1446* (2013.01); *G06F 2201/80* (2013.01)

(58) Field of Classification Search
CPC .............................. G06F 11/14; G06F 2201/80
See application file for complete search history.

(56) References Cited

U.S. PATENT DOCUMENTS

| 8,151,069 | B1 * | 4/2012 | Blitzer | G06F 11/1461 |
| | | | | 711/112 |
| 8,438,136 | B2 | 5/2013 | Ohr et al. | |
| 9,454,315 | B2 | 9/2016 | Dain et al. | |
| 9,535,800 | B1 * | 1/2017 | Natanzon | G06F 3/0683 |
| 9,927,980 | B1 * | 3/2018 | LeCrone | G06F 11/1456 |
| 10,108,352 | B2 | 10/2018 | Carpenter et al. | |

(Continued)

FOREIGN PATENT DOCUMENTS

| CN | 106407034 A | 2/2017 |
| CN | 107797883 | 3/2018 |

OTHER PUBLICATIONS

Faria, H., Hagstrom, R., Reis, M., Costa, B. G., Ribeiro, E., Holanda, M., . . . & Araújo, A. P. (2018). A Hadoop Open Source Backup Software Solution. In Proceedings of the 8th International Conference on Cloud Computing and Services Science (CLOSER 2018), pp. 651-657.

(Continued)

*Primary Examiner* — Tyler J Torgrimson
*Assistant Examiner* — Maher N Algibhah
(74) *Attorney, Agent, or Firm* — Konrad Raynes Davda & Victor LLP; Rabindranath Dutta

(57) ABSTRACT

A host system communicates to a production system that performs point-in-time copy operations to a backup system to generate a logical corruption protection (LCP) copy of a production copy that comprises a data set, wherein the point-in-time copy operations perform copying at a media level in which physical tracks are copied from the production system to the backup system, and wherein the point-in-time copy operations avoid using information on the data set or file structure that is included in a media on which the data set is stored. In response to a detection of a logical corruption in the data set, a recovery application executing in the host system recovers the data set from the LCP copy.

20 Claims, 10 Drawing Sheets

(56) References Cited

U.S. PATENT DOCUMENTS

| | | |
|---|---|---|
| 10,467,107 B1 | 11/2019 | Abrol et al. |
| 2004/0139128 A1* | 7/2004 | Becker ................ G06F 11/1458 714/E11.12 |
| 2005/0187992 A1* | 8/2005 | Prahlad ................ G06F 16/128 |
| 2021/0064601 A1* | 3/2021 | Chainani ............ G06F 16/2343 |
| 2021/0191824 A1* | 6/2021 | Veluswamy ........ G06F 11/1464 |

OTHER PUBLICATIONS

Cohen, S., & Money, W. H. (Jan. 2017). Data Systems Fault Coping for Real-time Big Data Analytics Required Architectural Crucibles. In Proceedings of the 50th Hawaii International Conference on System Sciences.

Malcher, M., & Kuhn, D. (2019) RMAN Backups and Reporting. In Pro Oracle Database 18c Administration (pp. 733-772). Apress, Berkeley, CA.

US Patent Application, "Application-Level Recovery From an Enterprise-Level Image Copy", U.S. Appl. No. 16/684,911, dated Nov. 15, 19, Total 52 pages.

Machine Translation for CN106407034A, published Feb. 15, 2017, Total 8 pages.

Machine Translation for CN107797883, published Mar. 13, 2018, Total 13 pages.

\* cited by examiner

DATA SET RECOVERY FROM A POINT-IN-TIME LOGICAL CORRUPTION PROTECTION COPY

BACKGROUND

1. Field

Embodiments relate to data set recovery from a point-in-time logical corruption protection copy.

2. Background

In certain computing environments, a storage controller allows host computing systems to perform input/output (I/O) operations with a plurality of storage devices controlled by the storage controller. A storage management application that executes in the storage controller may manage the plurality of storage devices, such as disk drives, tape drives, flash drives, direct access storage devices (DASD), etc., that are coupled to the storage controller. A host application that executes in a host computing system may transmit I/O commands to the storage controller and the storage controller may execute the I/O commands to read data from the storage devices or write data to the storage devices.

A point-in-time copy is a fully usable copy of a defined collection of data that includes an image of the data as it appeared at a single point-in-time. The point-in-time copy is considered to have logically occurred at the single point-in-time, but certain mechanisms may perform part or all of the copy at other times, as long as the result is a consistent copy of the data as it appeared at the single point-in-time. Prior to the use of point-in-time copy operations, in order to create a consistent copy of the data, a host application had to be stopped while the data was being physically copied. For large datasets, this caused stoppages of several hours, and made the process of making copies of large datasets very inconvenient for users. Point-in-time copy operations allow a copy to be created with almost no impact on the host application. Except for a brief period of a few milliseconds or seconds while the point-in-time copy is established, the host application can continue running. For example Flash-Copy* supported by International Business Machines (IBM*) is a point-in-time copy mechanism that makes it possible to create, nearly instantaneously, point-in-time snapshot copies of entire logical volumes or data sets.

* IBM, zSeries, pSeries, xSeries, BladeCenter, WebSphere, and DB2, Flash-Copy are trademarks of International Business Machines Corporation registered in many jurisdictions worldwide.

SUMMARY OF THE PREFERRED EMBODIMENTS

Provided are a method, system, and computer program product in which a host system communicates to a production system that performs point-in-time copy operations to a backup system to generate a logical corruption protection (LCP) copy of a production copy that comprises a data set, wherein the point-in-time copy operations perform copying at a media level in which physical tracks are copied from the production system to the backup system, and wherein the point-in-time copy operations avoid using information on the data set or file structure that is included in a media on which the data set is stored. In response to a detection of a logical corruption in the data set, a recovery application executing in the host system recovers the data set from the LCP copy.

In additional embodiments, the recovering of the data set from the LCP copy further comprises: transmitting a query to a catalog, to determine a set of logical devices in the production system in which the data set resides; identifying physical devices associated with the LCP copy from which the recovering of the data set is to be performed; identifying for the set of logical devices in the production system, a set of physical tracks in which the data set resides; and performing for the set of logical devices in the production system, a physical track copying of associated physical tracks corresponding to the data set from the LCP copy to the production copy.

In yet additional embodiments, the data set and the LCP copy are quiesced prior to the transmitting of the query. A release is performed of the quiescing of the data set and the LCP copies, subsequent to performing of physical track copying.

In further embodiments, the recovery application receives a request from a host application to recover the data set. The recovery application transmits a plurality of recovery points for the data set determined via communication with a logical corruption copy (LCP) management application. The recovery application receives an indication from the host application of a recovery point of the plurality of recovery points to which the data set is to be recovered.

In additional embodiments, the data set is recovered in response to determining that the data set exists in the production system in a corrupted form, and the data set has not moved since a recovery point.

In yet additional embodiments, a catalog stores information on which set of logical devices in the production system includes the data set, wherein the LCP copy is used to recover from the logical corruption of the data set caused by at least one of malicious encryption of the data set and alteration of data in the data set.

In further embodiments, copying of entire volumes are avoided while recovering the data set from the LCP copy.

BRIEF DESCRIPTION OF THE DRAWINGS

Referring now to the drawings in which like reference numbers represent corresponding parts throughout.

DETAILED DESCRIPTION

Figure 1:
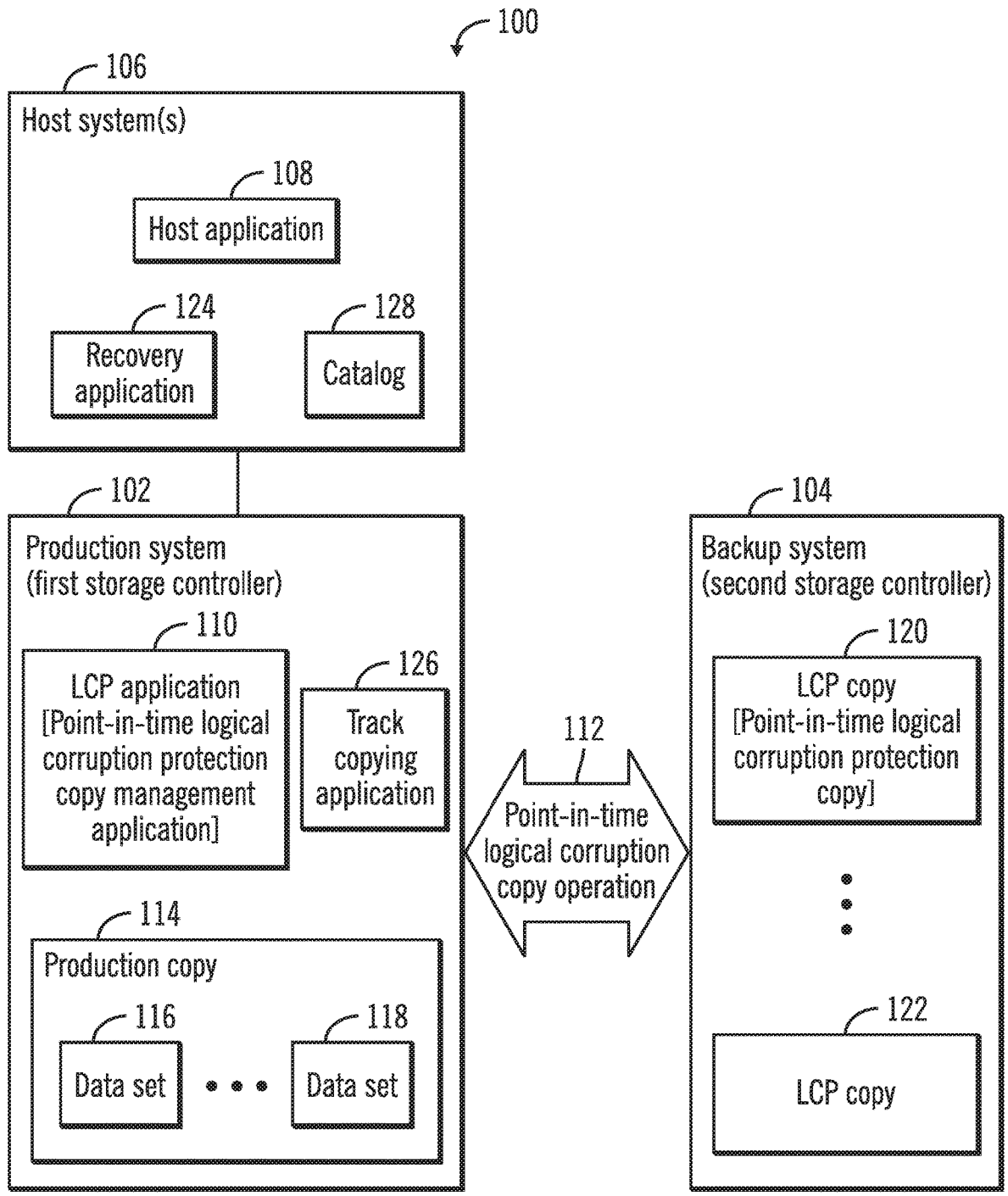
FIG. 1 illustrates a block diagram of a computing environment comprising a production system coupled to a backup system, where a host system is coupled to the production system, in accordance with certain embodiments.

In the following description, reference is made to the accompanying drawings which form a part hereof and which illustrate several embodiments. It is understood that other embodiments may be utilized and structural and operational changes may be made Storage systems may need to provide protection against accidental or intentional logical corruption of data. Logical corruption means that hardware components are working properly, but data has been destroyed or corrupted at the level of content. Such corruption may occur as a result of encryption of data, selective manipulation of data, etc.

Certain mechanisms may protect data from logical corruption by storing one or many copies offline on tape. Since the backup copies are offline, the copies are relatively secure, but recovery from these backup copies is relatively slow and not viable for all types of recovery situations, especially those failures related to the physical infrastructure for storing the data.

Failures related to the physical storage infrastructure have their own recovery techniques. Many organizations replicate copies of their data so that they may quickly swap to another site or region in the event of a failure of the physical storage infrastructure. This replicated data remains online and this provides for a very fast recovery time. In the event of a logical corruption or deletion, the corruption is replicated to all of the different sites and regions.

Certain types of disk storage technology attempt to integrate traits of online physical infrastructure protection (disk replication) and offline corruption protection by keeping many copies, by using point-in-time copy on storage that is neither physically, nor logically maintained by the operating system. These copies may be used to recover sets of volumes back to a previous consistent point in time, but the process to recover individual data sets is cumbersome and multiple steps may have to be performed manually.

In order to recover an individual data set in a production system, a backup system that may have a completely different operating system than the production system may be used to recover the set of volumes the data set resides on. Then another action may have to be performed to copy the data set back from the backup system to the production system. The data at the backup system may not be cataloged on the production system so each piece of the data set may have to be recovered individually. The process is complex, manual and error prone. Additionally, there is no mechanism for recovering individual data sets from the offline copies.

It should be noted that the point-in-time copy operations that take place between the production system and the backup system perform copying at a media level in which physical tracks are copied from the production system to the backup system. The point-in-time copy operations are not aware of information on the data set or file structure that may be included in a media on which the data set is stored, where the media may include any suitable storage device such as a hard disk, a tape, a solid state disk etc. As a result, the production system is on its own unable to recover from a logical corruption of a data set without copying the entirety of one or more volumes from the backup system to the production system.

Certain embodiments provide mechanisms performed by a recovery application that executes in a host system to recover individual data sets from these protection copies that are referred to as Logical Corruption Protection (LCP) copies. Such embodiments improve the operations of a computer system by providing mechanisms for the recovery of individual data sets in a production system from LCP copies in a backup system. A data set in the production system is quiesced to prevent any concurrent access and a LCP copy in the backup system is also quiesced to prevent roll-off or deletion during a recovery of the data set. A catalog is queried to find one or more logical devices in the production system where the data set resides and physical tracks are identified for each logical device associated with a LCP copy of the data set for the recovery. For each logical device from the one or more logical devices, certain embodiments perform a physical track copy of all the associated tracks from the LCP copy to the production copy. As a result, instead of copying entire physical or logical devices, only tracks of an individual data set that is corrupted are copied from the corresponding LCP copy.

Exemplary Embodiments

FIG. 1 illustrates a block diagram of a computing environment 100 comprising a production system 102 coupled to a backup system 104 and one or more hosts 106, in accordance with certain embodiments. In certain embodiments, the production system 102 may comprise a first storage controller and the backup system 104 may comprise a second storage controller.

The production system 102, the backup system 104, and the host 106 may comprise any suitable computational device including those presently known in the art, such as, a personal computer, a workstation, a server, a mainframe, a hand held computer, a palm top computer, a telephony device, a network appliance, a blade computer, a processing device, a controller, etc.

The production system 102, the backup system 104, and the host 106 may be elements in any suitable network, such as, a storage area network, a wide area network, the Internet, an intranet, etc. In certain embodiments, the production system 102, the backup system 104, and the host 106 may be elements in a cloud computing environment.

The production system 102 receives I/O commands from one or more host applications 108 that execute in the host 106 and responds to the I/O commands by reading or writing data with respect to storage volumes stored in storage devices coupled to the production system 102, where the storage devices may be comprised of hard disks, solid state disks, or other storage devices.

In certain embodiments, the host application 108 that executes in the host 106 sends a request to an LCP application 110 to perform a point-in-time logical corruption copy 112 of a production copy 114 whose logical storage volumes are controlled by the production system 102 and accessed by the host application 108 via the production system 102. The production copy 114 may be comprised of a plurality of data sets 116,118 stored in extents, tracks, blocks, or any other type of units in which storage may be represented.

In certain embodiments, the LCP application 110 of the storage controller 102 generates a point-in-time logical corruption copy (LCP copy) of the production copy 114 via point-in-time logical corruption copy operations 112, where the LCP copies 120,122 at a plurality of recovery points are stored in the backup system 104. The LCP application 110 may also be referred to a point-in-time logical corruption protection copy management application or a LCP management application. The LCP application 110 is not aware of the location of the data sets 116, 118 and performs copying to the backup system 104, by copying of tracks, extents, blocks or other types of subdivisions of storage to the backup system 104.

A recovery application 124 that executes in the host system 106 may be used to recover a data set from the LCP copies 120, 122 stored in the backup system 104, in the event of a logical corruption of the data set. As opposed to the LCP application 110 which is not aware of the locations of data sets in the production copy 114, the recovery application 124 is designed to be data set aware.

A track copying application 126 that executes in the production system 102 may be used to copy tracks, and a catalog 128 maintained in the host 106 may be used to provide information to recovery application 124, wherein the information provided by the catalog 128 may include information on which set of logical devices in the production system 102 includes the data set that is logically corrupted.

In certain embodiments, the LCP application 110, the recovery application 124, the track copying application 126, and the host application 108 may be implemented in software, firmware, hardware or any combination thereof.

Therefore, FIG. 1 illustrates certain embodiments in which LCP copies 120, 122 are used to recover a data set of a production copy, in the event of a logical corruption of the data set. The copying of entire volumes is avoided during recovery by copying only those tracks on which the data set resides. The LCP application 110 that executes in the production system 102 is not aware of data sets, whereas the recovery application 124 that executes in the host system 106 is aware of data sets.

Figure 2:
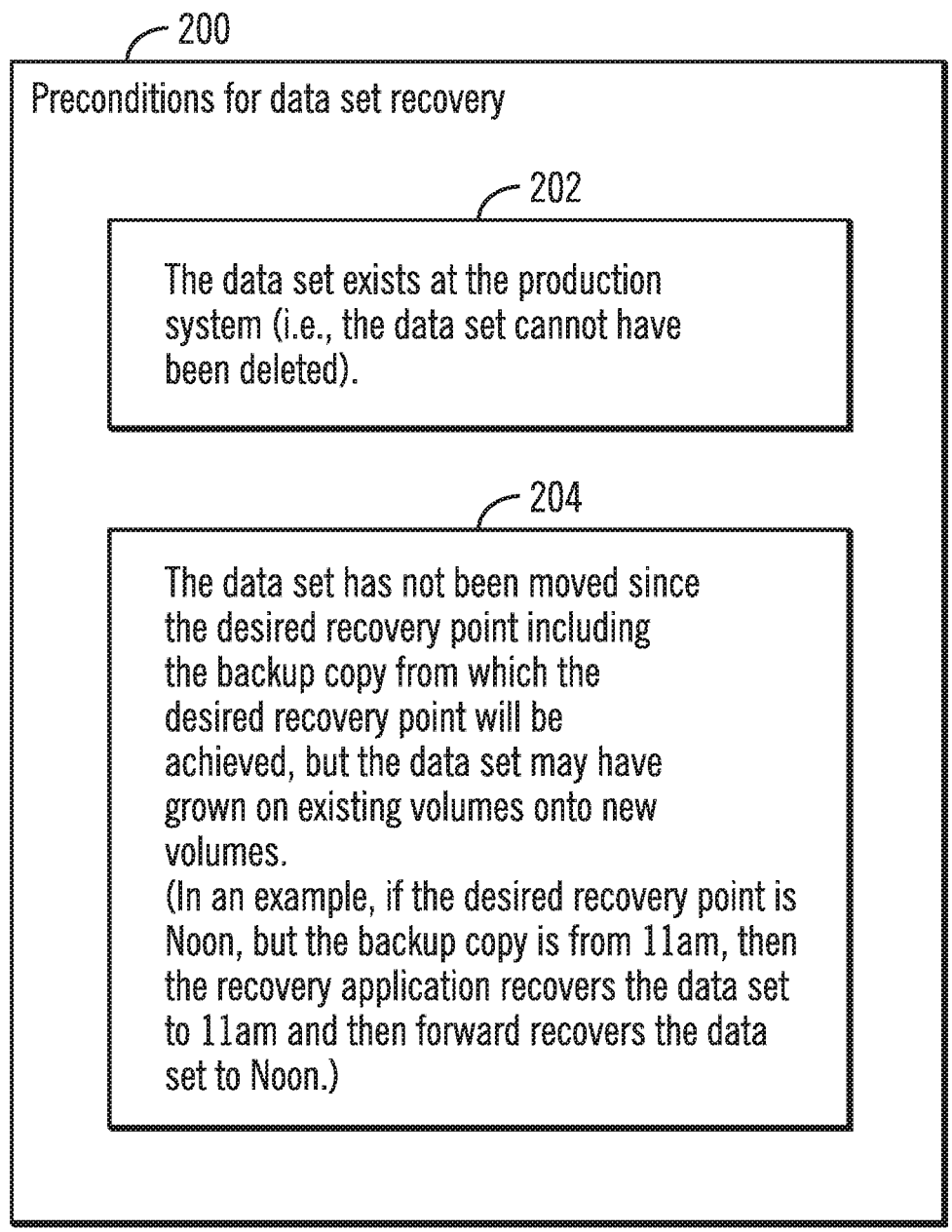
FIG. 2 illustrates a block diagram that shows preconditions for data set recovery, in accordance with certain embodiments.

FIG. 2 illustrates a block diagram 200 that shows preconditions for data set recovery, in accordance with certain embodiments.

The first precondition is that the data set exists at the production system 102 (i.e., the data set cannot have been deleted) [as shown via reference numeral 202]. The second precondition is that the data set has not moved since the desired recovery point, but the data set may have grown on existing volumes or extended onto new volumes (as shown via reference numeral 204). In an example, if the desired recovery point is Noon, but the backup copy is from 11 am, then the recovery application recovers the data set to 11 am and then forward recovers the data set to Noon).

Figure 3:
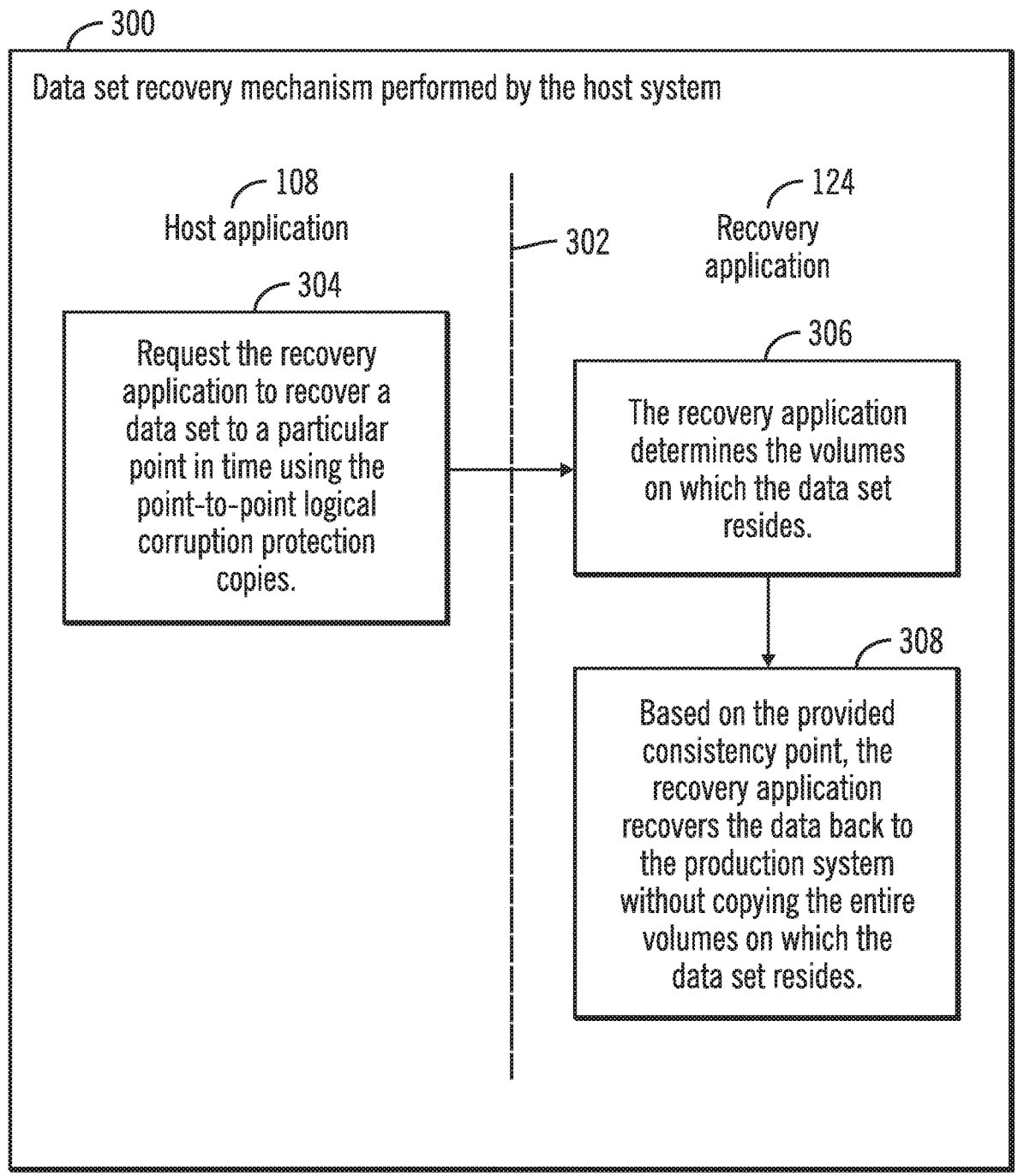
FIG. 3 illustrates a flowchart that shows operations performed in a data set recovery mechanism, in accordance with certain embodiments.

FIG. 3 illustrates a flowchart 300 that shows operations performed in a data set recovery mechanism performed by the host system 106, in accordance with certain embodiments. The operation shown in FIG. 3 may be performed in the computing environment 100. The operations performed by the host application 108 are shown to the left of the dashed lined 302, and the operations performed by the recovery application 124 are shown to the right of the dashed line 302.

Control starts at block 304 in which the host application 108 requests the recovery application 124 to recover a data set to a particular point in time (e.g., a time at which the data set was consistent, i.e., a consistency point) using the point-in-time logical corruption protection copies 120, 122.

From block 304 control proceeds to block 306 in which the recovery application 124 determines the volumes on which the data set resides. Based on the provided consistency point, the recovery application 124 recovers (at block 308) the data back to the production system 102 without copying the entire volumes on which the data set resides.

Figure 4:
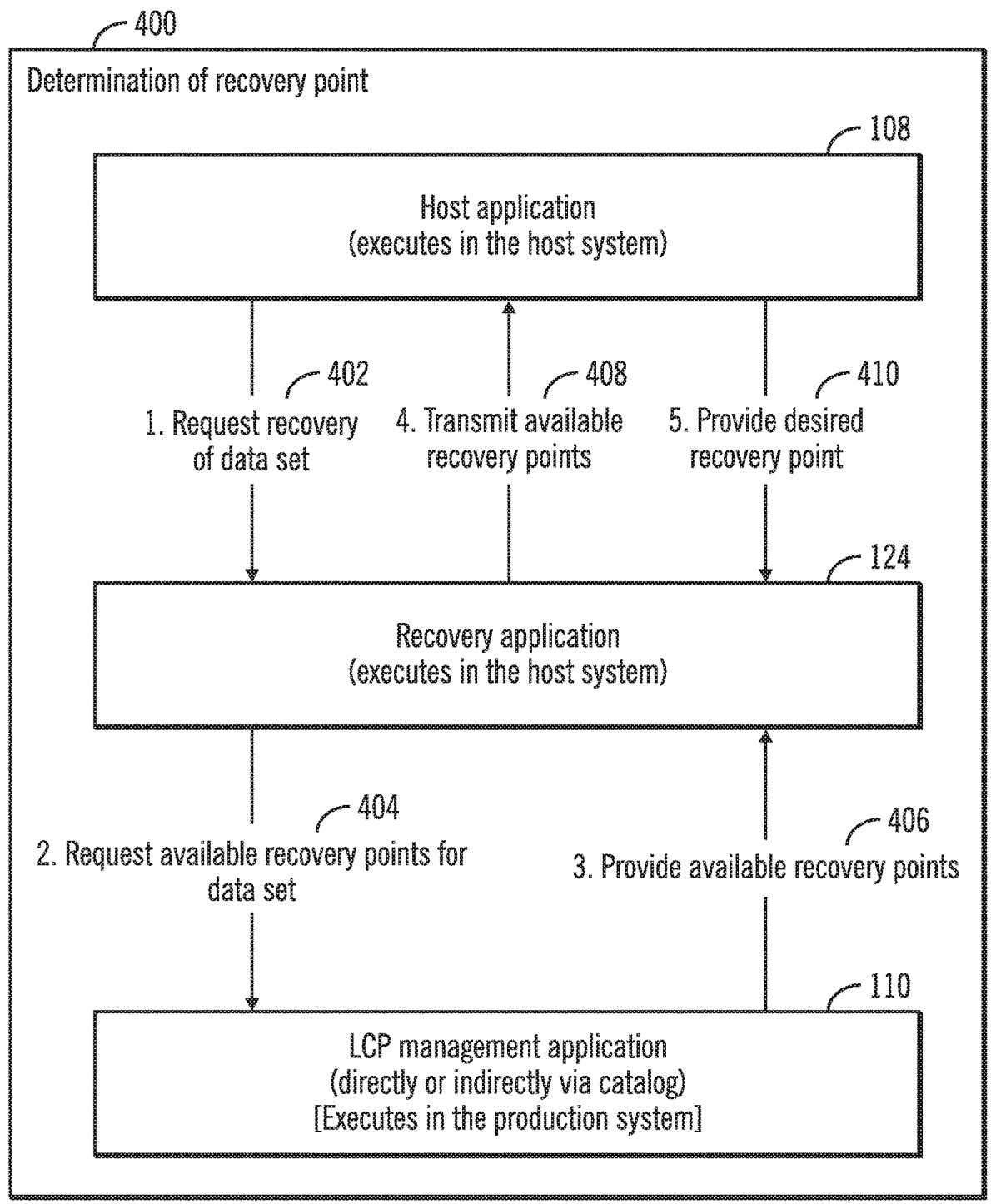
FIG. 4 illustrates a block diagram that shows the determination of a recovery point, in accordance with certain embodiments.

FIG. 4 illustrates a block diagram 400 that shows the determination of a recovery point, in accordance with certain embodiments.

The host application 108 that executes in the host system 106 requests recovery of a data set to the recovery application 124 that also executes in the host system 106 (show via reference numeral 402). The recovery application 124 requests the available recovery points (e.g., the consistency points) for the data set to the LCP management application 110 that executes in the production system 102 (shown via reference numeral 404).

The LCP management application 110 provides the available recovery points to the recovery application 124 (shown via reference numeral 406). The recovery application 124 transmits the available recovery points to the host application 108 (shown via reference numeral 408).

The host application 108 provides the desired recovery point based on the recovery points that are available to the recovery application 124 (shown via reference numeral 410).

Figure 5:
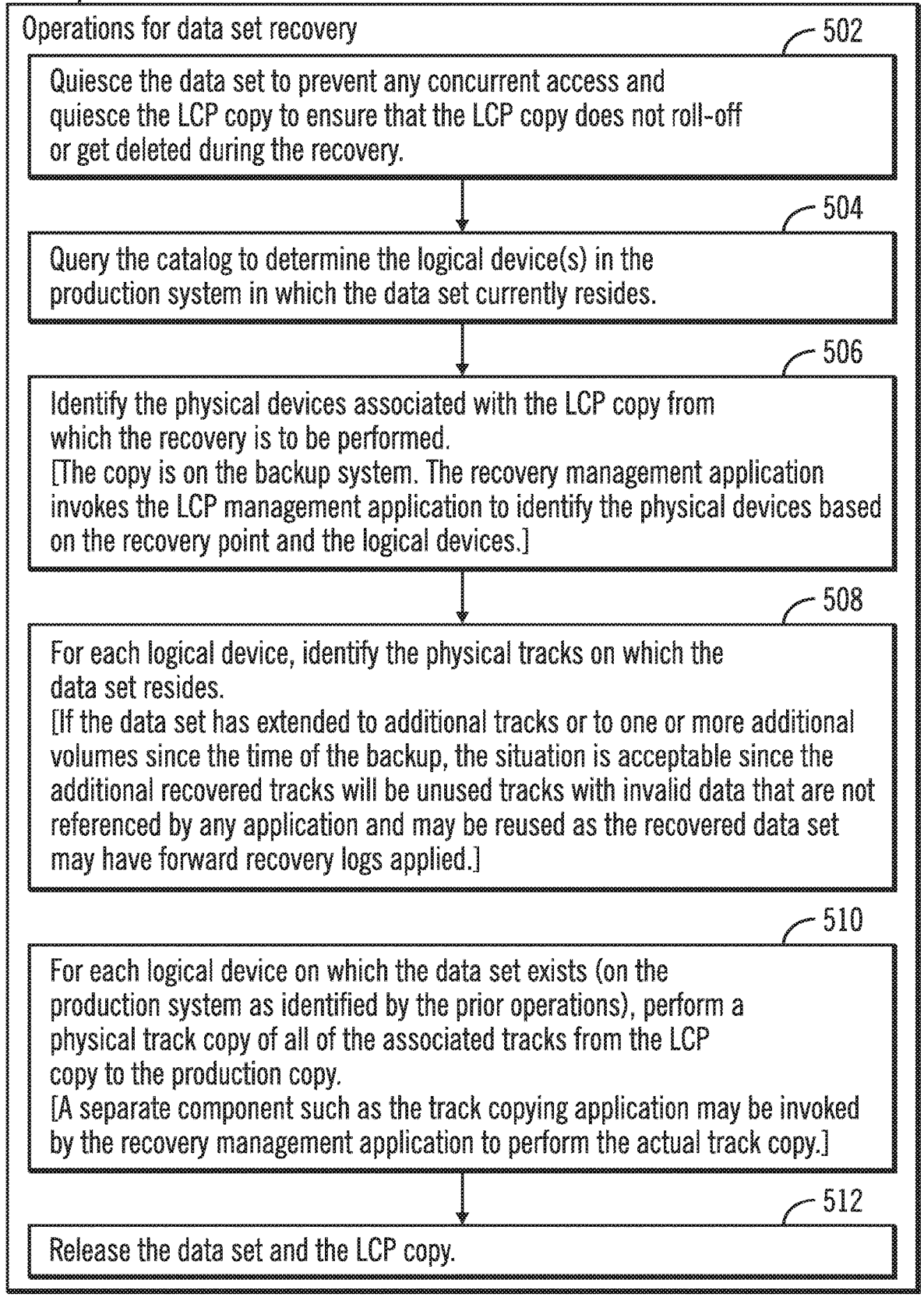
FIG. 5 illustrates a flowchart that shows operations for data set recovery, in accordance with certain embodiments.

FIG. 5 illustrates a flowchart 500 that shows operations for data set recovery, in accordance with certain embodiments. The operations shown in FIG. 5 may be performed at least by the recovery application 124 that executes in the host system 106.

Control starts at block 502 in which the recovery application 124 quiesces the data set to prevent any concurrent access and quiesces the LCP copy to ensure that the LCP copy does not roll-off or get deleted during the recovery. Control proceeds to block 504, in which, the recovery application 124 queries the catalog 128 to determine the logical device(s) in the production system 102 in which the data set currently resides.

From block 504 control proceeds to block 506 in which the recovery application 124 identifies the physical devices associated with the LCP copy from which the recovery is to be performed. The LCP copy is on the backup system 104. The recovery application 124 invokes the LCP management application 110 to identify the physical devices based on the recovery point and the logical devices.

For each logical device, the recovery application 124 identifies (at block 508) the physical tracks on which the data set resides. If the data set has extended to additional tracks or to one or more additional volumes since the time of the backup, the situation is acceptable since the additional recovered tracks will be unused tracks with invalid data that are not referenced by any application and may be reused as the recovered data set may have forward recovery logs applied.

For each logical device on which the data set exists (on the production system 102 as identified by the prior operations), the recovery application 124 uses the track copying application 126 to perform (at block 510) a physical track copy of all of the associated tracks from the LCP copy 120, 122 to the production copy 114. The recovery application 124 releases (at block 512) the data set and the LCP copy.

Figure 6:
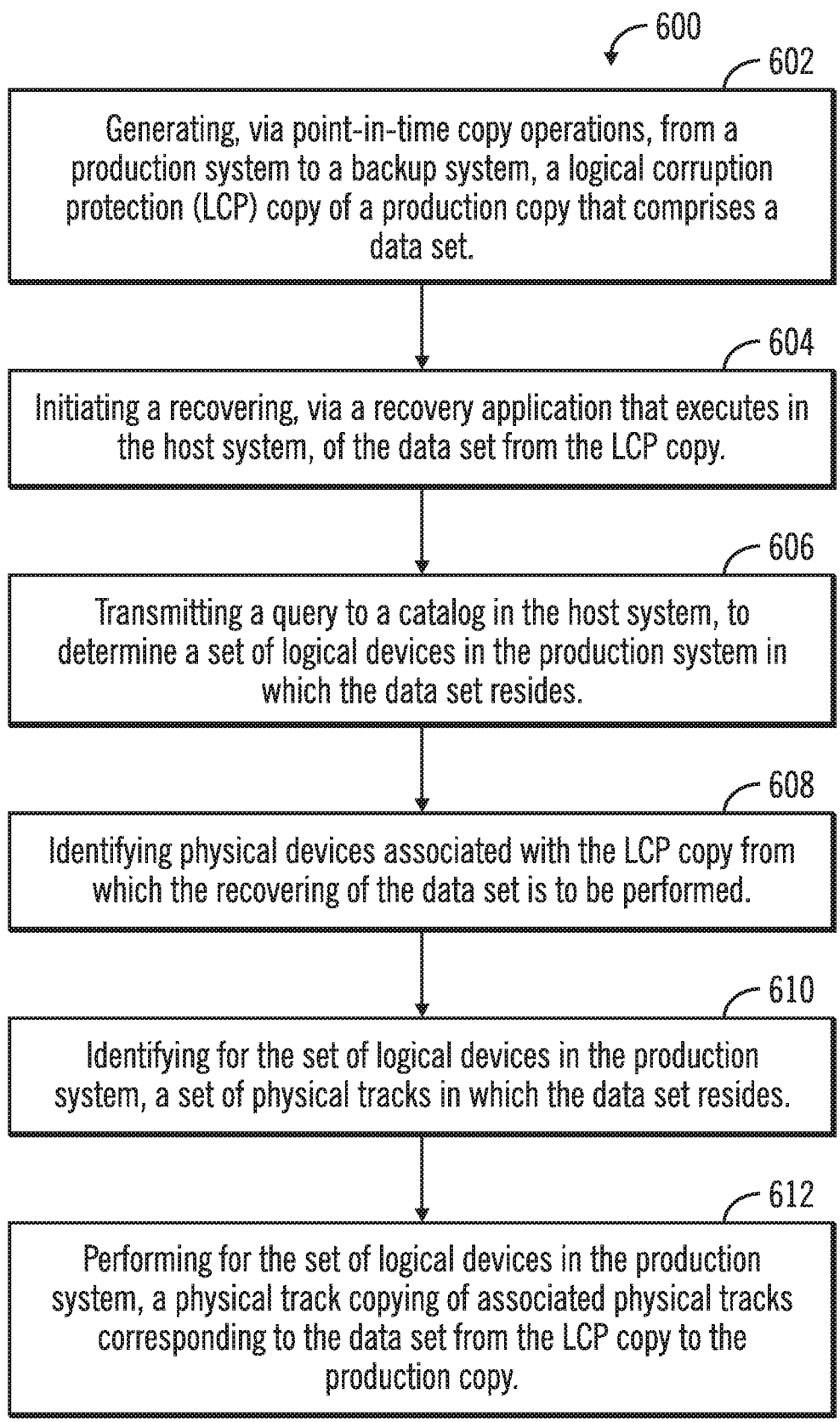
FIG. 6 illustrates a flowchart that shows additional operations for data set recovery, in accordance with certain embodiments.

FIG. 6 illustrates a flowchart 600 that shows additional operations for data set recovery, in accordance with certain embodiments. The operations shown in FIG. 6 may be performed at least by the recovery application 124 and other applications that execute in the production system 102.

Control starts at block 602 in which a logical corruption protection (LCP) copy 120, 122 of a production copy 114 that comprises a data set 116 is generated via point-in-time copy operations 112, from a production system 102 to a backup system 104. From block 602 control proceeds to block 604 in which a process to initiate the data set from the LCP copy 120, 122, via a recovery application 124 that executes in the host system 106, is initiated.

The recovery application 124 transmits (at block 606) a query to a catalog 128 in the host system 106, to determine a set of logical devices in the production system 102 in which the data set resides.

From block 606 control proceeds to block 608 in which the recovery application 124 identifies physical devices associated with the LCP copy from which the recovering of the data set is to be performed. The recovery application 124 them identifies (at block 610) for the set of logical devices in the production system 102, a set of physical tracks in which the data set resides.

From block 610 control proceeds to block 612 in which the recovery application 124 performs for the set of logical devices in the production system 102, a physical track copying of associated physical tracks corresponding to the data set from the LCP copy 120, 122 to the production copy 114.

Figure 7:
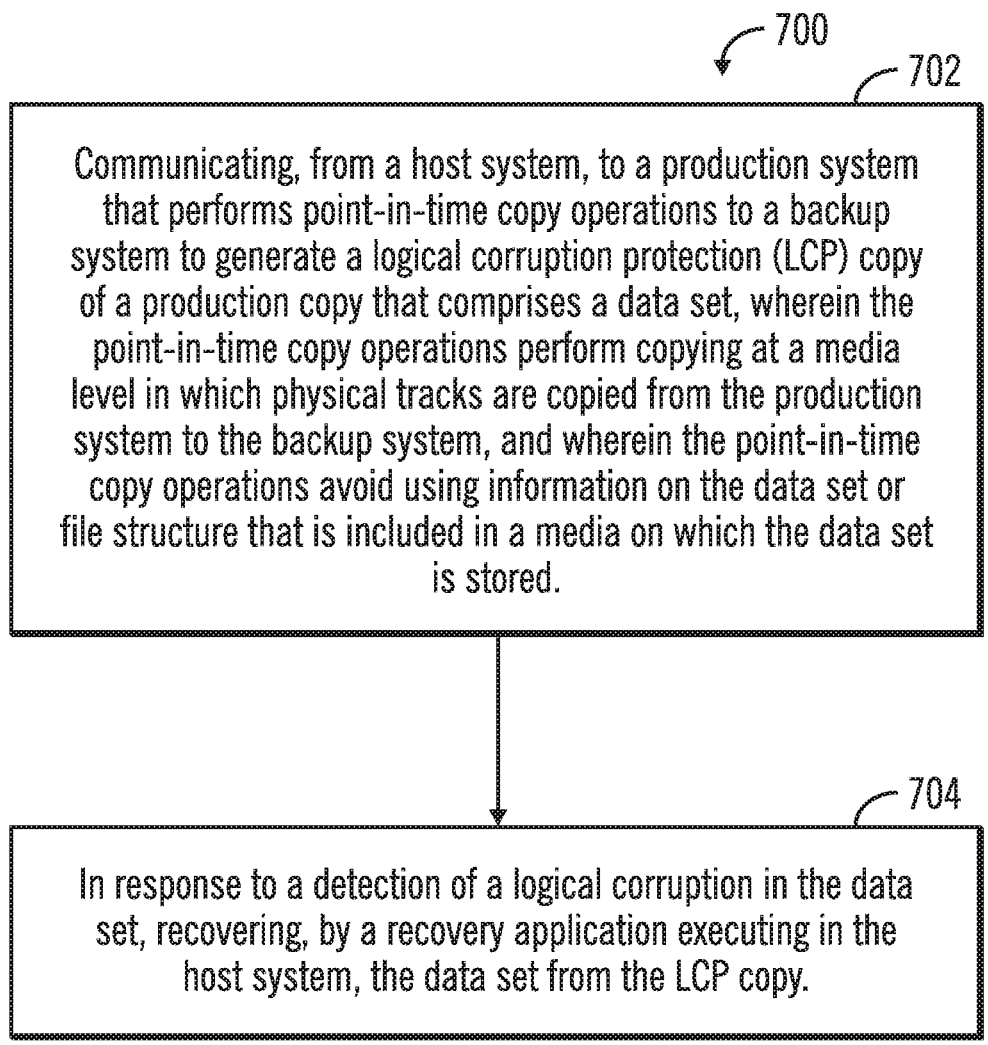
FIG. 7 illustrates a flowchart that shows further operations for data set recovery, in accordance with certain embodiments.

FIG. 7 illustrates a flowchart 700 that shows further operations for data set recovery, in accordance with certain embodiments. The operations shown in FIG. 7 may be performed in the host system 106, in certain embodiments.

Control starts at block 702 in which a host system 106 communicates to a production system 102 that performs point-in-time copy operations 112 to a backup system 104 to generate a logical corruption protection (LCP) copy 120, 122 of a production copy 114 that comprises a data set (e.g., one or more of data sets 116,118), wherein the point-in-time copy operations 112 perform copying at a media level in which physical tracks are copied from the production system 102 to the backup system 104, and wherein the point-in-time copy operations 112 avoid using information on the data set or file structure that is included in a media on which the data set is stored.

From block 702 control proceeds to block 704 in which in response to a detection of a logical corruption in the data set (e.g., one or more of the data sets 116, 118) a recovery application 124 executing in the host system 106 recovers the data set from the LCP copy.

Therefore, FIGS. 1-7 illustrate certain embodiments in which LCP copies of a data set are used in the event of a logical corruption to recover the data set by copying only tracks corresponding to the data set rather than entire volumes. The recovery application for performing the recovery executes on a host system, whereas the point-in-time copy operations that generate LCP copies in a backup system are performed by a production system. The point-in-time copy operations are not data set aware, whereas the recovery application is data set aware.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
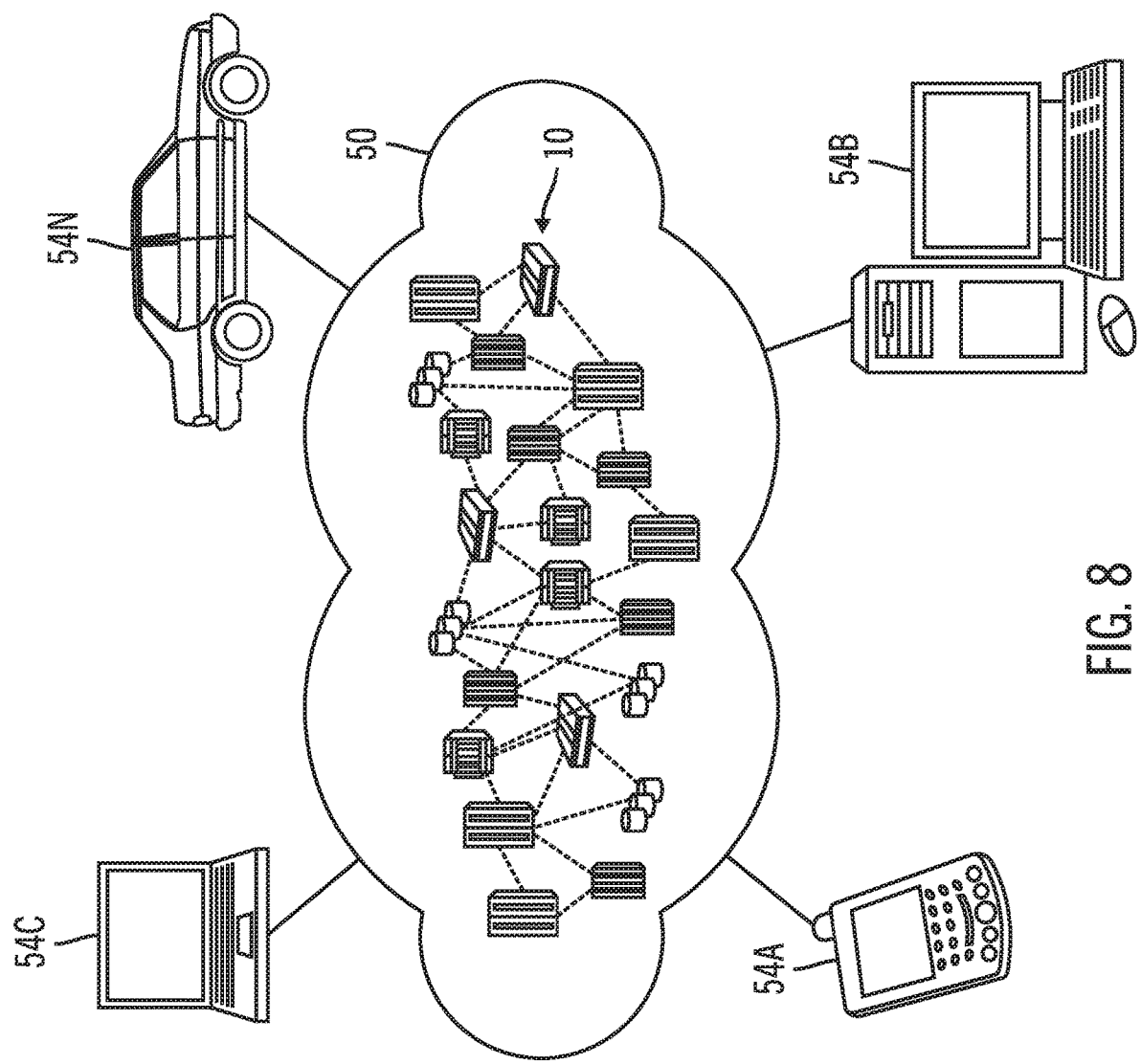
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
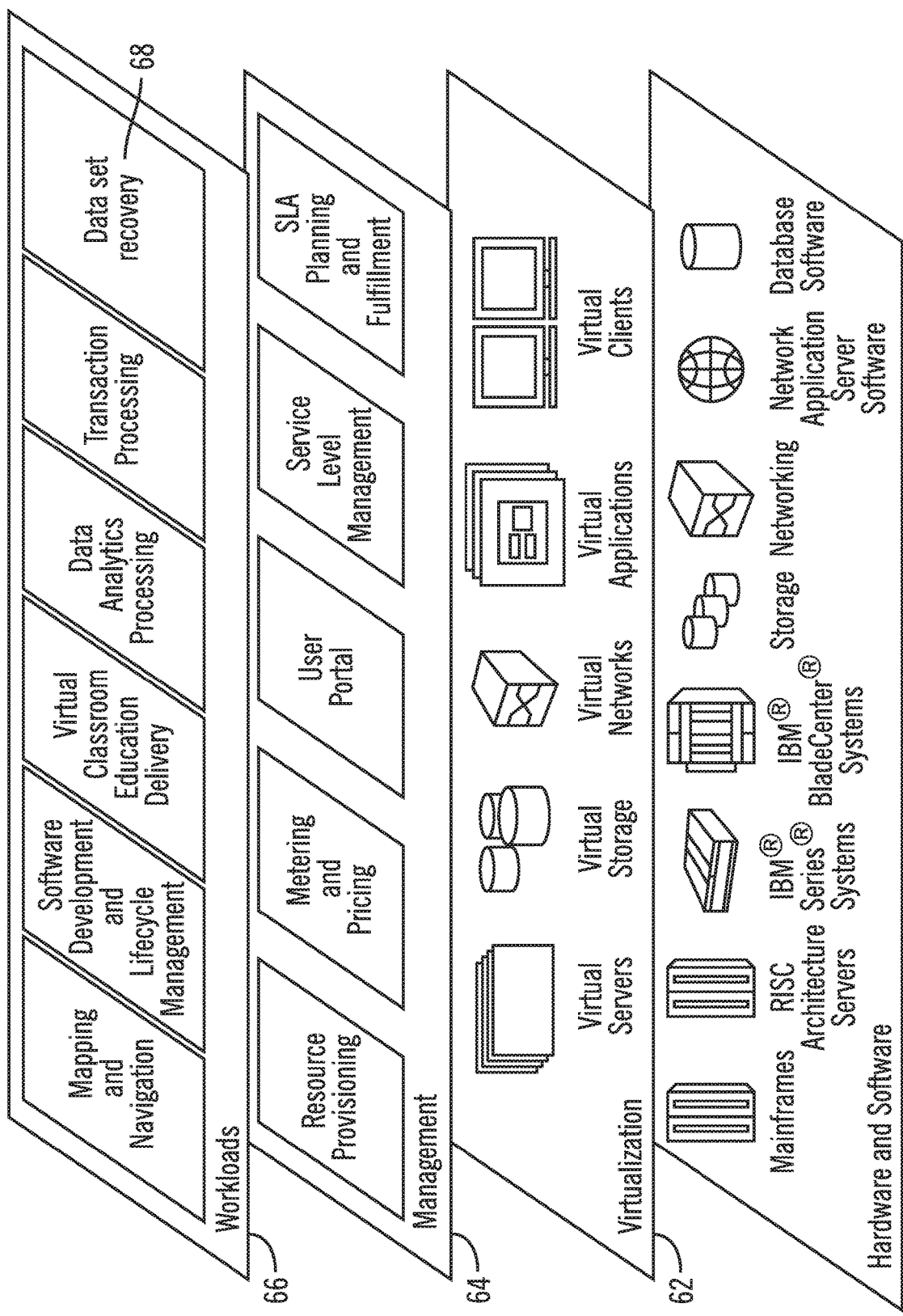
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data set recovery 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
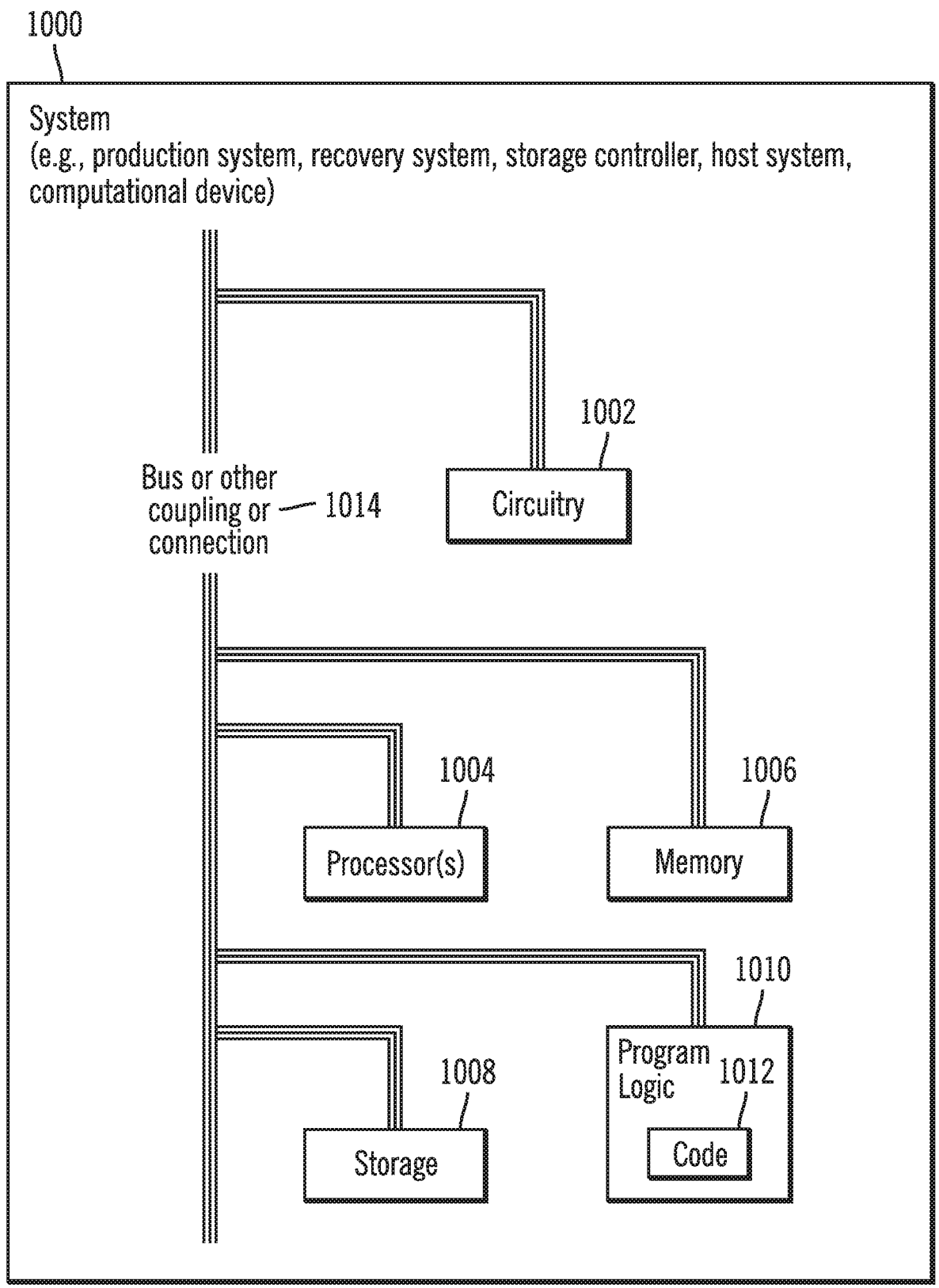
FIG. 10 illustrates a block diagram of a computational system that shows certain elements that may be included in the production system, backup system, and the host system as described in FIGS. 1-9, in accordance with certain embodiments.

FIG. 10 illustrates a block diagram that shows certain elements that may be included in the production system 102, the backup system 104, the host system 106, or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

communicating, from a host system, to a production system that performs point-in-time copy operations to a backup system to generate a logical corruption protection (LCP) copy of a production copy that comprises a data set, wherein the data set is stored in the production system and the LCP copy is stored in the backup system, and wherein the point-in-time copy operations do not use information on the data set or file structure that is included in a media on which the data set is stored; and in response to a detection of a logical corruption in the data set, recovering, by a recovery application executing in the host system, the data set from the LCP copy, wherein without using the recovery application and the LCP copy, the production system is unable to recover from the logical corruption in the data set without copying an entirety of one or more volumes from the backup system to the production system, wherein only tracks of the data set that is corrupted are copied from the LCP copy by the recovery application, and wherein the recovering of the data set from the LCP copy further comprises:

quiescing the data set in the production system and the LCP copy in the backup system, prior to transmitting of a query to a catalog in the host system, to determine a set of logical devices in the production system in which the data set resides; and releasing the quiescing of the data set and the LCP copy, subsequent to performing a physical track copying of associated physical tracks corresponding to the data set from the LCP copy to the production copy for the set of logical devices in the production system.

2. The method of claim 1, wherein the recovering of the data set from the LCP copy further comprises:
   in response to transmitting the query to the catalog, to determine the set of logical devices in the production system in which the data set resides, identifying physical devices associated with the LCP copy from which the recovering of the data set is to be performed; and
   identifying for the set of logical devices in the production system, a set of physical tracks in which the data set resides.

3. The method of claim 1, the method further comprising:
   receiving, by the recovery application, a request from a host application to recover the data set;
   transmitting, by the recovery application, a plurality of recovery points for the data set determined via communication with a LCP management application; and
   receiving, by the recovery application, an indication from the host application of a recovery point of the plurality of recovery points to which the data set is to be recovered.

4. The method of claim 1, wherein the data set is recovered in response to determining that the data set exists in the production system in a corrupted form, and the data set has not moved since a recovery point.

5. The method of claim 1, wherein the catalog stores information on which set of logical devices in the production system includes the data set, and wherein the LCP copy is used to recover from the logical corruption of the data set caused by at least one of malicious encryption of the data set and alteration of data in the data set.

6. The method of claim 5, wherein copying of entire volumes are avoided while recovering the data set from the LCP copy.

7. The method of claim 1, wherein quiescing the data set prevents concurrent access, and quiescing the LCP copy prevents deletion of the LCP copy during the recovering of the data set from the LCP copy.

8. A system coupled to a production system, the system comprising:
   a memory; and
   a processor coupled to the memory, wherein the processor performs operations, the operations comprising:
   communicating to the production system, wherein the production system performs point-in-time copy operations to a backup system to generate a logical corruption protection (LCP) copy of a production copy that comprises a data set, wherein the data set is stored in the production system and the LCP copy is stored in the backup system, and wherein the point-in-time copy operations do not use information on the data set or file structure that is included in a media on which the data set is stored; and
   in response to a detection of a logical corruption in the data set, recovering, by a recovery application, the data set from the LCP copy, wherein without using the recovery application and the LCP copy, the production system is unable to recover from the logical corruption in the data set without copying an entirety of one or more volumes from the backup system to the production system, wherein only tracks of the data set that is corrupted are copied from the LCP copy by the recovery application, and wherein the recovering of the data set from the LCP copy further comprises:
   quiescing the data set in the production system and the LCP copy in the backup system, prior to transmitting of a query to a catalog in the system, to determine a set of logical devices in the production system in which the data set resides; and
   releasing the quiescing of the data set and the LCP copy, subsequent to performing a physical track copying of associated physical tracks corresponding to the data set from the LCP copy to the production copy for the set of logical devices in the production system.

9. The system of claim 8, wherein the recovering of the data set from the LCP copy further comprises:
   in response to transmitting the query to the catalog, to determine the set of logical devices in the production system in which the data set resides, identifying physical devices associated with the LCP copy from which the recovering of the data set is to be performed; and
   identifying for the set of logical devices in the production system, a set of physical tracks in which the data set resides.

10. The system of claim 8, the operations further comprising:
    receiving, by the recovery application, a request from a host application to recover the data set;
    transmitting, by the recovery application, a plurality of recovery points for the data set determined via communication with a LCP management application; and
    receiving, by the recovery application, an indication from the host application of a recovery point of the plurality of recovery points to which the data set is to be recovered.

11. The system of claim 8, wherein the data set is recovered in response to determining that the data set exists in the production system in a corrupted form, and the data set has not moved since a recovery point.

12. The system of claim 8, wherein the catalog stores information on which set of logical devices in the production system includes the data set, and wherein the LCP copy is used to recover from the logical corruption of the data set caused by at least one of malicious encryption of the data set and alteration of data in the data set.

13. The system of claim 12, wherein copying of entire volumes are avoided while recovering the data set from the LCP copy.

14. The system of claim 8, wherein quiescing the data set prevents concurrent access, and quiescing the LCP copy prevents deletion of the LCP copy during the recovering of the data set from the LCP copy.

15. A computer program product, the computer program product comprising a computer readable storage medium having computer readable program code embodied therewith, the computer readable program code configured to perform operations, the operations comprising:
    communicating, from a host system, to a production system that performs point-in-time copy operations to a backup system to generate a logical corruption protection (LCP) copy of a production copy that comprises a data set, wherein the data set is stored in the production system and the LCP copy is stored in the backup system, and wherein the point-in-time copy operations do not use information on the data set or file structure that is included in a media on which the data set is stored; and in response to a detection of a logical corruption in the data set, recovering, by a recovery application executing in the host system, the data set from the LCP copy, wherein without using the recovery application and the LCP copy, the production system is unable to recover from the logical corruption in the data set without copying an entirety of one or more volumes from the backup system to the production system, wherein only tracks of the data set that is corrupted are copied from the LCP copy by the recovery application, and wherein the recovering of the data set from the LCP copy further comprises:

quiescing the data set in the production system and the LCP copy in the backup system, prior to transmitting of a query to a catalog in the host system, to determine a set of logical devices in the production system in which the data set resides; and releasing the quiescing of the data set and the LCP copy, subsequent to performing a physical track copying of associated physical tracks corresponding to the data set from the LCP copy to the production copy for the set of logical devices in the production system.

16. The computer program product of claim 15, wherein the recovering of the data set from the LCP copy further comprises:

in response to transmitting the query to the catalog, to determine the set of logical devices in the production system in which the data set resides, identifying physical devices associated with the LCP copy from which the recovering of the data set is to be performed; and identifying for the set of logical devices in the production system, a set of physical tracks in which the data set resides.

17. The computer program product of claim 15, the operations further comprising:

receiving, by the recovery application, a request from a host application to recover the data set;

transmitting, by the recovery application, a plurality of recovery points for the data set determined via communication with a LCP management application; and receiving, by the recovery application, an indication from the host application of a recovery point of the plurality of recovery points to which the data set is to be recovered.

18. The computer program product of claim 15, wherein the data set is recovered in response to determining that the data set exists in the production system in a corrupted form, and the data set has not moved since a recovery point.

19. The computer program product of claim 15, wherein the catalog stores information on which set of logical devices in the production system includes the data set, and wherein the LCP copy is used to recover from the logical corruption of the data set caused by at least one of malicious encryption of the data set and alteration of data in the data set.

20. The computer program product of claim 15, wherein quiescing the data set prevents concurrent access, and quiescing the LCP copy prevents deletion of the LCP copy during the recovering of the data set from the LCP copy.

* * * * *